March 14, 1961 C. F. SPITZER 2,975,290
ELECTROLUMINESCENT DEVICES AND NETWORKS
Filed May 15, 1956 5 Sheets-Sheet 1
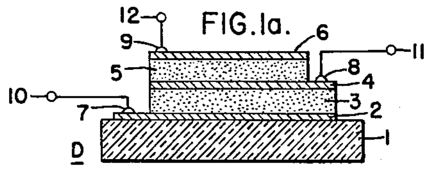
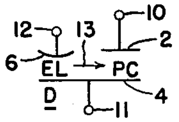
FIG. 1b.
FIG. 2.
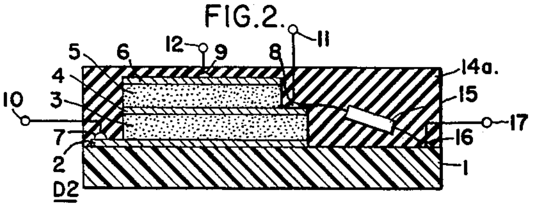
FIG. 3.
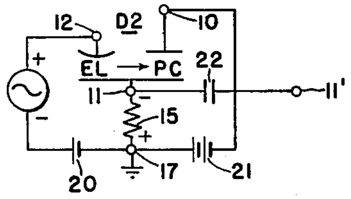
FIG. 4.
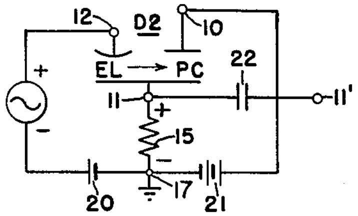
FIG. 5.
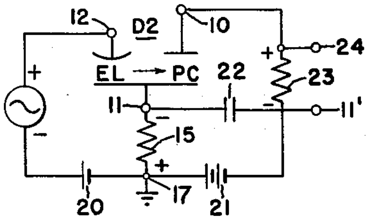
FIG. 6.
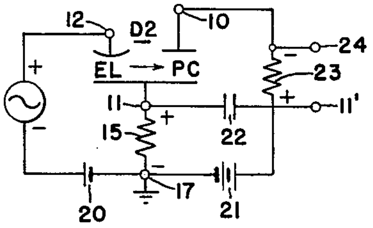
FIG. 7.
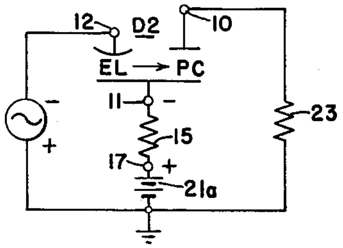
FIG. 8.
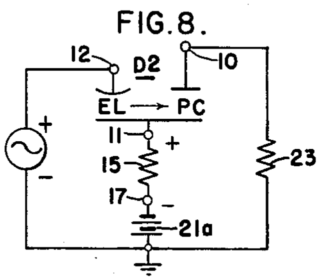
INVENTOR:
CHARLES F. SPITZER,
BY Charles M. Hutchins
HIS ATTORNEY.

March 14, 1961 C. F. SPITZER 2,975,290

ELECTROLUMINESCENT DEVICES AND NETWORKS

Filed May 15, 1956 5 Sheets-Sheet 2

INVENTOR:
CHARLES F. SPITZER,

BY *Charles M. Hutchins*

HIS ATTORNEY.

INVENTOR:
CHARLES F. SPITZER,

BY *Charles M. Hutchins*

HIS ATTORNEY.

March 14, 1961 C. F. SPITZER 2,975,290

ELECTROLUMINESCENT DEVICES AND NETWORKS

Filed May 15, 1956 5 Sheets-Sheet 4

INVENTOR:
CHARLES F. SPITZER,

BY *Charles M. Hutchins*

HIS ATTORNEY.

ELECTROLUMINESCENT DEVICES AND NETWORKS

INVENTOR:
CHARLES F. SPITZER,

BY Charles M. Hutchins

HIS ATTORNEY.

United States Patent Office 2,975,290
Patented Mar. 14, 1961

2,975,290

ELECTROLUMINESCENT DEVICES AND NETWORKS

Charles F. Spitzer, Syracuse, N.Y., assignor to General Electric Company, a corporation of New York Filed May 15, 1956, Ser. No. 585,052

32 Claims. (Cl. 250—213)

This invention relates to electrical and electro-optical networks including an electroluminescent phosphor and a photoconductor as elements thereof, and to composite circuit elements or devices embodying or adapted for use in such networks. More particularly, the invention relates to such devices and networks which are adapted for use as amplifiers of electrical energy or radiant light energy or both, as active filters, as oscillators, or as multistable trigger circuits or the like.

The phenomenon of electroluminescence upon which the operation of the networks and devices of the present invention in part depends is the process by which certain semiconducting materials, known as phosphors, emit radiation at room temperature under the primary stimulus of an applied electric field or potential. For a survey and bibliography of the subject of electroluminescence, reference is hereby made to an article by Destriau and Ivey entitled "Electroluminescence and Related Topics," in volume 43, No. 12, December 1955, "Proceedings of the Institute of Radio Engineers."

As noted therein, electroluminescent phosphors have in the past been used as light sources in devices frequently called luminescent capacitors or electroluminescent cells. Such devices often resemble a flat plate capacitor and may comprise two parallel planar electrodes at least one of which contains, in one form or another, an electroluminescent phosphor. The phosphor may be in the form of microcrystals suspended in a transparent plastic or dielectric binder. Alternatively, the phosphor may be in the form of a continuous, transparent crystalline layer such as that disclosed in U.S. Patent No. 2,709,765 to L. R. Koller, or in the form of single crystals as disclosed in Patent No. 2,721,950 to Piper and Johnson. In general the microcrystal-in-plastic type of phosphor dielectric exhibits electroluminescence only under excitation by alternating current fields, while the latter two types exhibit electroluminescence when excited by either alternating or unidirectional current fields.

Such cells, when including a photoconductive layer between the dielectric and one of the two electrodes thereof have also been used as elements of image intensifying screens or as light amplifiers. These image intensifiers depend upon a local change in the impedance of the photoconductor in accordance with the intensity of the incident image to produce a voltage-dividing action across the series-connected photoconductor and phosphor, thus varying the voltage applied to the phosphor and hence its light output. An image is reproduced due to the fact that the amount of change of photoconductor impedance varies from point to point in the screen according to the intensity of the incident image.

It has also been proposed that electroluminescent cells, when connected in electrical series relation with a photoconductor and a voltage supply and so located that the emission from the cell falls upon the photoconductor, be used as an overvoltage indicator or information storage device. Reference is made to a note by A. Bramley and J. E. Rosenthal, "Transient Voltage Indicator and Information Display Board," in the "Review of Scientific Instruments," volume 24 (1953), p. 471.

For the purposes of this specification a photoconductor may be considered to mean any substance the volume impedance of which varies as a function of the radiation emitted by the particular associated electroluminescent phosphor. The photoconductor may be said to be in "radiation-coupled relationship" with the electroluminescent cell when they have any physical juxtaposition and geometry which regularly and reproducibly causes the volume impedance of the photoconductor to vary as a function of the emission from the electroluminescent phosphor. Further, for the purposes of this specification, the network in which the photoconductor and the electroluminescent phosphor are included will be said to be an "electro-optical network" when there is an interaction in the network between energy applied to the network as an electrical signal or bias and energy applied to the network as a signal or bias in the form of radiant or light energy.

Known devices of the type disclosed by Bramley and Rosenthal, for example, generally depend for their operation upon a variable voltage divider action in the electrical series circuit arrangement of the power source, electroluminescent phosphor, and photoconductor. The range of utility of the device is thus dependent upon the impedance relationship in this series circuit. More generally, the advantages and disadvantages of devices of this type are determined by the construction of the particular device and the structure and electrical characteristics of the electrical network of which the device and its associated elements, if any, are the concrete physical embodiments.

It would be highly desirable in the art to have a device and network which affords a large degree of flexibility in the control of these network characteristics and thus results in a wider range of utility.

It is therefore an object of this invention to provide a novel electrical network having three separate branches connected to a common point, one of said branches containing an electroluminescent phosphor and another of said branches containing a photoconductor positioned in radiation-coupled relationship therewith.

It is a further object of this invention to provide a new and improved three-electrode electroluminescent device incorporating an electroluminescent phosphor and photoconductive material arranged as a composite article for use in such a network.

It is a further object of this invention to provide novel electrical networks including such a device and adapted for use as amplifiers, filters, oscillators, and bistable information storage and display systems.

It is a further object of this invention to provide electrical and electro-optical networks capable of amplifying electrical power or radiant light energy, or both, and adapted to make optimum use of electrical feedback in conjunction with optimum means of supplying power to the network.

It is a further object of this invention to provide such a network which is adapted to accept input signal energy in the form of electrical, radiant, or mechanical energy.

Briefly stated, my invention provides a three-branch electrical network having four electrically distinct connection points. An electroluminescent phosphor is connected between a first pair of connection points, a photoconductor between a second pair, and an electrical feedback element between a third pair. The photoconductor is chosen to have a volume impedance which varies as a function of the radiation emitted from the electroluminescent phosphor and is positioned in radiation-coupled relationship therewith. This network may conveniently be embodied in a compact, sturdy, electroluminescent device including radiation-coupled electroluminescent and photoconducting members, having an interposed radiation-transmitting conducting member to provide one terminal of the device, with separate electrical connections to opposed surfaces of the members providing two additional terminals. Variation in the nature and magnitude of the associated feed-back impedance provides a number of unique and useful circuit configurations for generation, amplification, filtering, and translations of electrical and optical signals.

While the novel and distinctive features of the invention are pointed out in the appended claims, a more expository treatment of the invention, in principle and detail, together with additional objects and advantages thereof, is afforded by the following description and accompanying drawings of representative embodiments in which corresponding elements in different views are indicated by like reference characters throughout and wherein:

Figure 1*a* is a vertical sectional view of a device in accordance with one embodiment of the invention.

Figure 1*b* is a schematic representation of the device of Figure 1*a*.

Figure 2 is a vertical sectional view of a device in accordance with another embodiment of the invention.

Figures 3 through 9, 11, and 13 through 22 are circuit diagrams of various manners of operating the device of the present invention.

Figures 10 and 12 are graphs showing the characteristics of the filter circuits of Figures 9, 13 and 15 and Figures 11, 14 and 16 respectively.

Figure 9:
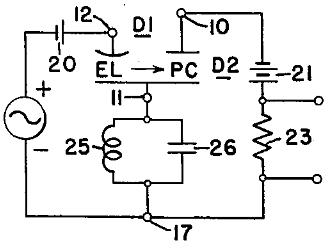

Turning now to the drawings and in particular to Figure 1*a* thereof, there is illustrated therein a vertical sectional view of a three-electrode device D of the present invention. The device consists of a base plate or supporting member 1 which may conveniently be glass, quartz, mica or any other electrically insulating material which also transmits light. In this specification it will be understood that the word "light" is used to include any electromagnetic radiation emitted by an electroluminescent phosphor when electrically excited. In practice this radiation may lie in the visible or invisible region of the spectrum.

Deposited upon and in extended area contact with supporting member 1 is a light-transmitting conducting electrode 2 which may be a conducting layer of titanium dioxide ($TiO_2$) or tin oxide, commonly referred to as conducting glass. Alternatively a very thin, light-transmitting layer of evaporated metal such as aluminum or silver may be used. If the light-transmitting conducting electrode 2 is titanium dioxide it may be prepared and rendered conductive in accord with the teachings of Patent 2,717,844 to L. R. Koller.

Deposited upon and in extended area contact with light-transmitting electrode 2 is a thin light permeable layer of a photoconductive material 3. This material may, for example, comprise cadmium sulfide or lead sulfide which may be sprayed, sputtered, or evaporated on the light-transmitting conducting electrode 2. More generally photoconductive layer 3 may, for example, consist of any of the sulfides, selenides, or tellurides, of cadmium, lead, or zinc, or may be any other known photoconductor deposited in any conventional manner.

Deposited upon and in extended area contact with photoconducting layer 3 is a second light-transmitting conducting electrode 4 which may comprise any one of the materials utilized to form light-transmitting conducting electrode 2 and may be deposited in like manner.

Deposited upon and in extended area contact with conducting layer 4 is a thin layer 5 comprising an electroluminescent phosphor which may either be a powdered crystalline mass of electroluminescent phosphor suspended in a dielectric medium, a light-transmitting continuous crystalline phosphor layer, or one or more properly oriented single crystals of an electroluminescent material. Conveniently, the phosphor may be zinc sulfide activated with about 0.3 percent by weight of copper (ZnS:Cu) and dispersed in a transparent dielectric for devices intended to be A.-C. excited. For devices intended to be D.-C. or A.-C. excited, phosphors such as ZnS:Cu may be prepared as a continuous crystalline layer as disclosed in the above-noted U.S. Patent 2,709,765 to L. R. Koller; or alternatively single-crystal phosphors of the type disclosed in the above-noted U.S. Patent 2,721,950 to Piper and Johnson may be used. It will, of course, be understood that these examples are given merely by way of illustration and that any suitable known electroluminescent phosphor may be used. Layer 5 may be deposited by spraying a light-transmitting dielectric medium which may, for example, be nitrocellulose or an alkyd resin in which the powdered phosphor is dispersed. As a further alternative, layer 5 may be prepared as a light-transmitting continuous, homogeneous, crystalline phosphor by the vapor reaction technique taught by U.S. Patent 2,675,331 to Cusano and Studer.

Finally, upon phosphor layer 5, there is deposited in extended area contact therewith a third conducting electrode 6 which is preferably light-transmitting and may comprise any of the materials from which the electrodes 2 and 4 are formed and may be formed by the same method. Electrode 6 may, alternatively, be any convenient form of point or line contact rather than an extended area contact. It is only necessary that the phosphor be electrically excited by potentials applied to electrodes 6 and 4. Electrical contact is made with each of the conducting electrodes 2, 4, and 6 as by drops of solder 7, 8, and 9 respectively so that lead wires may be brought out from these electrodes to the three terminals 10, 11, and 12 of the device.

It will be noted that photoconductor 3 is positioned in radiation-coupled relationship with phosphor 5 and the photoconductors preferably should be chosen to have a spectral response matching the spectral emission of the particular electroluminescent phosphor used. That is to say, the volume impedance of the photoconductor should vary as a function of the radiation emitted from the electroluminescent phosphor. In view of the fact that photoconductor 3 is in contact with electrodes 2 and 4 throughout the area of its respective approved surfaces, the equipotential surfaces provided by electrodes 2 and 4 will cause this variation of impedance to be uniform throughout the photoconductor.

Turning now to Figure 1*b*, there is defined therein, for convenience in illustrating circuit embodiments of the invention, a symbol representative of the device of the present invention. Terminals 10, 11, and 12 are shown connected to electrodes 2, 4, and 6 respectively. The arrow 13 is used to indicate that there is radiation-coupling between the electroluminescent substance, designated E.L. in the drawings, between electrode 6 and common electrode 4, and the photoconductive substance, designated P.C. on the drawings, between common electrode 4 and electrode 2.

It will of course be understood that the device shown in Figure 1*a* has not been drawn to scale and may in fact be constructed in various configurations or shapes without changing the essential electrical relationships of the parts thereof. Also the positions of the electroluminescent and photoconductive layers in relation to the support member 1 could, of course, be interchanged if the particular manufacturing technique used made this desirable. Furthermore the device may be encased to exclude ambient light.

Figure 23:
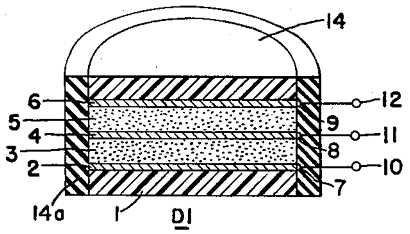
Figures 23, 24, 25 and 26 are perspective views, partly in section, of other embodiments of the device of the present invention.

The device D1 shown in Figure 23, for example, consists of a round base plate or supporting member 1, which in this case would be an electrically-insulating material which is opaque to ambient light or radiation. Preferably the surface of the supporting member 1 upon which conducting layer 2 is deposited should be polished or otherwise caused to reflect back into the active portion of the device the maximum amount of radiation incident thereon through photoconductive layer 3 from electroluminescent layer 5 via the light-transmitting conducting layer 4. A second disc 14 of electrically-insulating light-opaque material such as that used for supporting disc 1, and also having its undersurface polished to reflect light emitted by electroluminescent cell 5, is positioned on top of light-transmitting conducting layer 6. Discs 1 and 14 may, for example, consist of any suitable plastic material. The purpose of polishing to a light-reflecting state, the surfaces of these discs 1 and 14 which are adjacent transparent electrodes 2 and 6, is to avoid absorption loss of the radiation emitted by electroluminescent layer 5 and thus provide maximum sensitivity in the electrical operation of the device. The entire device is encased by a sheath of any suitable electrically-insulating light-opaque potting resin, or other similar material, 14*a*. It will of course be understood that device D1 of Figure 23 may also be represented by the schematic symbol of Figure 1*b*. If no other indication is given on this symbol, it is intended that the device is used for purely electrical operation and that all ambient light is excluded from the device, either by a casing as shown in Figure 23 or by other convenient means if the device of Figure 1*a* is used.

As a further alternative, there is shown in Figure 2, a device D2 which is another modification of the device of Figure 1*a*. Again corresponding parts of the device are indicated by corresponding reference characters. Specifically, supporting member 1, which in this instance is a light-opaque electrically-insulating material, has a metallic conducting layer 2, photoconductive layer 3, light-transmitting conducting layer 4, electroluminescent layer 5 and metallic conducting layer 6 deposited thereon similarly to the devices of Figures 1*a* and 23. Likewise, connections 7, 8, and 9 are made for terminals 10, 11, and 12. In this embodiment, however, electrodes or conducting layers 2 and 6 are shown as metallic layers of sufficient thickness to render the electrodes themselves light-reflecting. Additionally, a resistor or other electrical impedance element 15 is connected between contact point 8 and a contact point 16 on extended supporting member 1. A fourth terminal for the device may be brought out from point 16 as at 17. The entire device may then be encased in a potting resin or other suitable light-opaque insulator 14*a* similar to that used for device D1.

Figure 27:
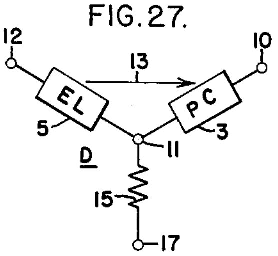
Figures 27, 28, 29, 30 and 31 are schematic circuit diagrams illustrating the network configuration of various embodiments of the invention.
Figure 28:
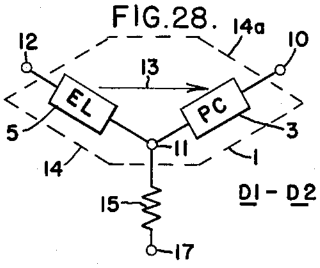

A schematic diagram showing the network configuration of device D of Figure 1*a* to which is connected an external impedance element 15, is given in Figure 27. In Figure 28 a similar schematic diagram represents the devices D1 and D2 of Figure 23 and of Figure 2, respectively. In Figure 28 the dashed line having segments 1, 14, and 14*a* merely indicates that ambient light is excluded from the active elements of the device. Again the notation E.L. and P.C. indicates the electroluminescent phosphor and the photoconductor respectively. It will of course be understood that whether the impedance element 15 is externally connected to a device such as D1 of Figure 23 or is included as an integral part of a device such as D2 of Figure 2 is governed purely by manufacturing considerations and will not alter the essential network relations or behavior. From Figures 27 and 28 which relate to purely electrical operation rather than to electro-optical operation, it is apparent that the device D2, as manufactured, and the devices D and D1 when connected to external impedance 15, are embodiments of an electrical network having three branches, one end of which is connected to a common terminal 11 brought out from nodal point 8 and the other end of each of which is also a terminal, as shown at 10, 12 and 17, available for connection to operating or signal power, or output circuits. Such a network is commonly referred to as a Y network. The impedance elements of the three branches of the network are the electroluminescent phosphor 5, the photoconductor 3, and the impedance element 15, the nature and value of which may be chosen at will for optimum operation in circuit applications to be described below. As in Figure 1*b*, the arrow 13 in Figures 27 and 28 indicates that the electroluminescent phosphor 5 and the photoconductor 3 are positioned in radiation-coupled relationship.

The devices shown in Figures 1*a*, 2 and 23 and having the network configurations represented in Figures 27 and 28 may, as noted above, the conveniently represented for purposes of the following circuit diagrams by the symbol of Figure 1*b*. This symbol will be used for that portion of the following discussion which is concerned with the operation of the device solely as a device having an electrical input and an electrical output. That is to say, unless otherwise indicated, it is assumed that all ambient or other external light is excluded in any convenient manner from the device in its operation.

Figure 32:
Figures 32, 33 and 34 are line-block diagrams illustrating the possible input and output signal relationships of the device and network of the present invention.

This purely electrical operation of the network is indicated in generalized form in Figure 32 where an electrical input signal comprising a voltage E, and current I, is shown applied to the network represented by the block Y from which an electrical output signal comprising a voltage $E_2$ and current $I_2$, is derived. As is shown in such books as "Principles of Transistor Circuits," edited by Richard F. Shea, John Wiley and and Sons, New York, 1953 (see chapter 15), a set of input, output, forward and reverse transfer impedance parameters may be measured for three-terminal networks; and these parameters may then be used as coefficients in a pair of simultaneous equations relating the variable $E_1$, $I_1$ and $E_2$, $I_2$ to describe the network behavior by what is commonly known as four-pole analysis. The form of this generalized analysis is indicated here as an aid to a clear understanding of the operation of the specific circuit applications to be described below.

Turning now to Figure 3 there is shown, by way of example, a device D2 of the type shown in detail in Figure 2 including a feedback impedance 15 which may conveniently be a resistor. A biasing battery 20 and a source of input signal are connected in series between terminals 17 and 12. Although the input signal is indicated as being an A.-C. signal, it will of course be understood that it could also be a D.-C. signal, and that it may be applied in any convenient manner at any point in the circuit where it will affect the voltage across the electroluminescent cell. An output power supply 21 is connected between terminals 17 ad 10, and output is taken from terminal 11 through a coupling capacitor 22 which is brought out to a terminal 11'. That is to say, resistor 15 serves as both the load and feed-back impedance.

It is here assumed that the electroluminescent phosphor used in the device is prepared in the manner noted above so that it may be either D.-C. or A.-C. excited. The function of the bias battery 20 is to maintain a constant level of emission so that when an A.-C. signal is applied, the light output of the phosphor will vary about this level rather than about zero light output as the A.-C. signal goes through zero. In this manner it is possible to eliminate the full-wave rectifying action of the phosphor which would result if an A.-C. signal were applied in the absence of a bias power supply. The bias also serves to adjust the no-signal value of the impedance of the photoconductor by determining the amount of light incident thereon. It will be noted that the output power supply 21 is in the loop containing the feedback-load impedance 15 and the photoconductor between terminals 10 and 11.

The circuit operates as follows: A small signal of positive polarity with respect to ground and applied to terminal 12 causes the phosphor to emit more light thus reducing the impedance of the photoconductor. This in turn causes more current to be drawn from battery 21 and the resulting voltage drop across resistor 15 causes a negative signal to appear at terminals 11 and 11'. This decrease in potential of terminal 11 results in a greater potential difference between terminals 11 and 12, which is turn results in a further increase of light output from the phosphor. This in turn further decreases the impedance of the photoconductor; that is to say, the circuit as shown has positive or regenerative feed-back. The amplifying action of the circuit depends upon the fact that the change fo photoconductor impedance will control the flow of power from battery 21, which may be chosen to provide a relatively high level of power flow. This change of impedance is in turn brought about by the change in light output of the electroluminescent phosphor which in turn is a function of the electrical signal applied to it. This input signal may be at a much lower power level than is maintained in the output circuit by battery 21, but will still control the flow of power in the output circuit. As is well known in the literature, the brightness B of light output of an electroluminescent phosphor is related to the applied signal E, by the equation $$B=KE_1^n \quad (1)$$

where K and $n$ are constants which differ for each particular phosphor, and are defined by, and may be experimentally-measured, in accordance with Equation 1. Values of $n$ for known phosphors range from 1 to 7.

On the other hand, the impedance $Z_p$ of many known photoconductors decreases in the presence of radiation below the dark-impedance value, which the photoconductor has in the absence of radiation, approximately as an inverse linear function of the brightness B of radiation incident thereon. These properties permit the network interactions noted above.

It should be noted that the presence of the resistor 15 does not significantly decrease the bias voltage applied to the electroluminescent cell by source 20 between terminals 11 and 12 when the D.-C. resistance of the cell is many times the value of the load resistor 15 which latter may be chosen to have a value of the same order of magnitude as that of the photoconductor when illuminated at bias intensity. From this choice of comparable magnitudes for resistance 15 and the photoconductor, it follows that a small change in the impedance of the photoconductor due to an applied signal will result in a relatively large change in the percentage of the voltage supplied from battery 21 which appears across resistor 15 or between treminals 11 and 17. This latter voltage is not only taken as an output signal but is also applied as feed-back to the electroluminescent cell as noted above. That is to say, the feed-back ratio, which may be defined as the fraction of the output voltage applied as feed-back, in this case is unity. It should be noted that, due to the Y network connection, the magnitude of this feed-back voltage is substantially independent of the impedance of the electroluminescent cell the phosphor of which may therefore be chosen and deposited in such a way as to achieve optimum light emission characteristics without regard to what its impedance value may be. If the resistor 15 is of correct value in relation only to the impedance of the photoconductor of the device, as set forth above, enough regeneration may be supplied to cause the circuit to become bi-stable as will be explained in greater detail below. It should, however, be noted at this time that by proper choice of operating conditions in relation to the value of resistor 15 in the circuit shown in Figure 3, the device may also be operated as a stable amplifier of small electrical input signals.

It should also be pointed out that bias battery 20 may in some instances be omitted in the circuit of Figure 3. That is, the desired no-signal bias may also be developed by the voltage drop across resistor 15 in series with the photoconductor in the standby state of the circuit. Since this inherent bias is, however, determined by the choice of parameters in the output circuit, it may not be the optimum value desired from the point of view of the input circuit bias requirements. Hence, battery 20, which may be of either polarity as required by particular circuits, may be desired for optimum operation.

If the polarity of the power supply 21 in the load circuit is reversed, as shown in Figure 4, negative feedback rather than positive feedback results as shown by the indicated signal and feed-back polarities. Similarly, reversal of the polarity of the bias source 20 permits reversal of the polarity of feedback. Otherwise the circuit of Figure 4 is the same as that of Figure 3. The advantages of negative or degenerative feedback are well known. These advantages include increased speed of response, wider frequency range, and improved linearity. In this network these advantages are obtained by a simple reversal of the polarity of power supplies 20 or 21. The operation of the circuit of Figure 4 is similar to that of the circuit of Figure 3, but as will be noted from the polarities indicated, a positive signal applied to terminal 12 will be opposed by the signal appearing across resistor 15 resulting in the negative or degenerative feedback noted above.

As will be seen in Figures 5 and 6 an additional load resistor 23 may be connected in series with power supply 21 in the output circuit and another output taken at terminal 24. It will of course be seen that the polarity of source 21 in Figure 5 is such as to give a positive or regenerative feedback whereas the source 21 in Figure 6 has a polarity such as to give negative or degenerative feedback. In either event the polarity of the output taken across resistor 23 will be opposite to the polarity of the output taken across resistor 15. That is to say, Figure 5 is essentially a phase-splitting circuit having regenerative feedback whereas Figure 6 is a phase-splitting circuit having degenerative feedback. In these circuits the absolute value of the feedback ratio is given by the ratio of the resistance of resistor 15 to the sum of the resistances of resistors 15 and 23, whereas it is the sum of these two resistances which must be considered in determining optimum impedance matching relations to the photoconductor impedance.

In Figures 7 and 8 there are illustrated similar phase-splitting circuits which utilize only a single power source 21a connected in the feedback branch so as to serve as both the bias supply and the output power supply. When however, battery 21a has the polarity shown in either Figure 7 or 8 negative feedback results. The signal polarities shown in these figures are both such as to cause a greater flow of current and are both opposed by the resulting output signal. Of course, signal output may be taken from across any of the impedances in the output circuit as shown explicitly in previous figures.

In the circuits of Figures 7 and 8, the amount of bias voltage to be applied to the electroluminescent cell and the feedback ratio may both be determined from a choice of the voltage of the source 21a, the size of the resistor 15, the known value of the photoconductor resistance, and from the choice of value for the load resistor 23. The economy and convenience of the possibility of operating an active device with negative feedback from such a single power supply of either polarity while yet retaining a flexibility of choice as to the circuit parameters and the feedback ratio to be obtained, is self-evident. This flexibility of choice results from the fact that in the circuits of Figures 7 and 8 the electroluminescent cell and the photoconductor are in parallel with the single source of power rather than in series therewith. It is thus seen that the Y network included between terminals 10, 12, and 17 in each of Figures 3 through 8 and in Figures 27 and 28 has unique properties in each of the specific modes of applying signal and supply power to it.

Since the feedback element 15 in Figures 3–8 is shown as a resistor, a rather wide frequency response in the amplifier circuits might be expected. Actually, however, many electroluminescent phosphors and photoconductive materials have upper frequency limits to their response. Thus, through proper choice of phosphors a frequency selective response can be obtained, resulting in filtering action. This filtering action can be further enhanced and controlled, however, by an appropriate choice of the nature of feedback impedance 15, as will be now explained.

Turning now to Figures 9 through 16 and in particular to Figure 9, elements previously described in conjunction with the discussion of Figures 1 through 8 are again indicated by corresponding reference characters. Feedback impedance 15 in Figure 9 consists of a parallel resonant circuit consisting of inductor 25 and capacitor 26 connected between terminals 11 and 17. The circuit of Figure 9 with the source polarities as shown will develop maximum positive feedback at the resonant frequency $f_0$ of this parallel LC circuit, thus showing maximum gain at that frequency. This action results in the response plotted in Figure 10 which is a graph of the output voltage V across load resistor 23 as a function of the frequency of the applied signal.

Figure 10:
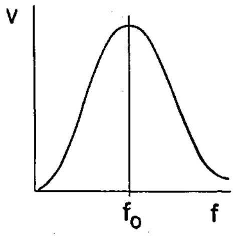
Figure 11:
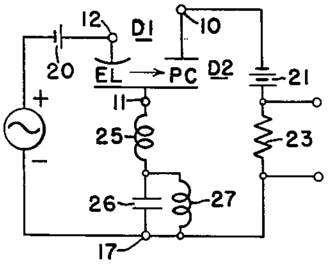
Figure 12:
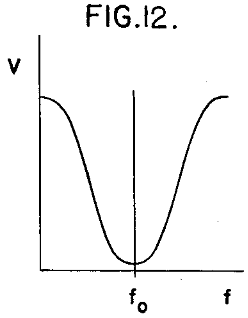

If, as shown in Figure 11, the parallel resonant circuit is replaced by a series LC circuit consisting of inductor 25 and capacitor 26, shunted by a choke coil 27 to afford a D.-C. path, the response of Figure 12 results. Like Figure 10, Figure 12 is a plot of the voltage V appearing across load resistor 23 as a function of the frequency of the applied signal voltage. It will of course be understood that in either Figure 9 or Figure 11 output could be taken directly from terminal 11 rather than across the load resistor 23 which could then either be omitted or used to obtain an output of different phase from that taken from terminal 11.

Figure 13:
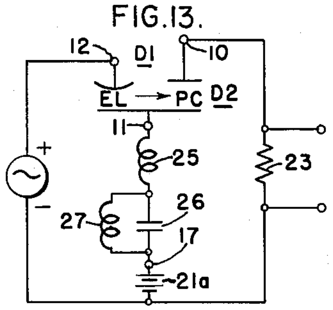
Figure 14:
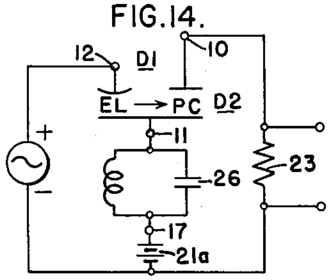

If, as shown in Figures 13 and 14, the feedback branch contains the one and only voltage source 21*a*, which may be of either polarity as noted above, degeneration results and leads to a frequency selective response. In this case, a series LC circuit in the feedback branch, such as is shown in Figure 13, has minimum impedance at resonance and results in the response of Figure 10; and a parallel LC circuit in the feedback branch, such as is shown in Figure 14, has maximum impedance at resonance and results in the response of Figure 12, both results being due to the fact that the feedback is negative.

From a comparison of Figures 9 and 13 which both give the response shown in Figure 10 and from a similar comparison of Figures 11 and 14 which both give the response shown in Figure 12, it is apparent that in these circuits either a parallel or a series resonant circuit may be used in the feedback branch to give either a band pass or a notch filter response simply by choice of the appropriate manner of applying the power supply. In practical applications this flexibility in the choice of circuit parameters to obtain a desired result is one very great advantage of the present invention over other known circuits.

Figure 15:
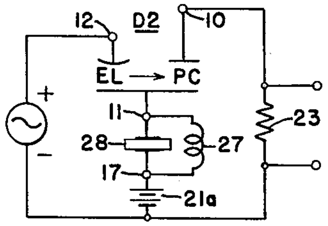
Figure 16:
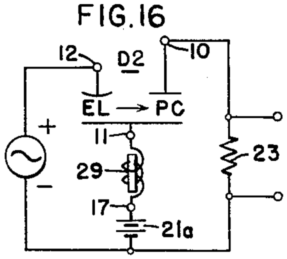

It should be further noted that more elaborate filter circuits could be used in the feedback branch, as for example, special band pass structures. Furthermore, where the physical size or other considerations make electrical networks undesirable, these filter elements can also be of the piezoelectric or the magnetostrictive type. Such a choice would, for example, be desirable where a device of the type of D2 shown in Figure 2 is to be constructed with the feedback impedance as well as the rest of the unit potted in a single encasing sheath 14*a* so that the entire device could be built as a unit. In Figure 15 a circuit embodying piezoelectric crystal 28 shunted by choke coil 27 is shown while in Figure 16 a circuit including a magnetostrictive rod 29 is shown. It is well known that the equivalent circuit of a piezoelectric crystal is that of a series resonant circuit shunted by a capacitance. The circuit of Figure 15 will therefore have the response shown in Figure 10. It is also well known that the equivalent circuit of a magnetostrictive rod is that of a parallel resonant circuit in series with an inductance. The circuit of Figure 16 will, therefore, have the response of Figure 12. Of course the responses obtained with either of these circuits of Figures 15 or 16 could again be interchanged simply by appropriate selection of the manner of supplying power to the device in the manner illustrated in detail above. Thus, a single compact unit built to include either a piezoelectric crystal or a magnetostrictive rod may be predesigned and assembled to have either a band pass or a notch filter characteristic depending entirely upon how it is connected to external power supplies.

Figure 17:
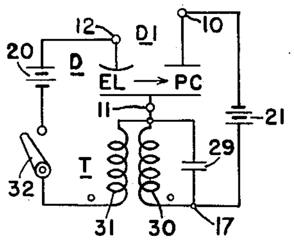

In Figure 17 a device D1 of the type shown in Figure 23 is shown connected in an oscillator circuit. The polarity of the coupling transformer T is chosen such that the system has positive feedback from the parallel resonant circuit consisting of the secondary 30 of transformer T and capacitor 29. The primary 31 of the transformer T is connected through a switch 32 and bias supply 20 to terminal 12 of device D1. The tuned secondary 30 is connected back to terminal 10 through power supply 21.

In operation. when switch 32 is closed, the electroluminescent cell brightens. The decrease of the impedance of the photoconductive cell permits an increased current flow through the transformer winding 30, increasing the induced voltage in winding 31. The windings are phased as indicated by the conventional dots thereon. This induced voltage causes further brightening of the electroluminescent cell which in turn further decreases the photoconductor impedance. The process continues until the electroluminescent cell saturates or until the photoconductor no longer decreases its resistance upon further illumination. At this point the rate of change of current through winding 30 decreases and the brightness of the cell decreases. This action continues until the electroluminescent cell is dark or until the photoconductor has reached its maximum resistance. At this point there is a reversal and the cycle repeats. The frequency of oscillation is affected by all the capacitances and inductances in the circuit as well as by the speed of response of the phosphor used in the cell and by the speed of response of the photoconductor.

Although phosphors prepared to be D.-C. excited are presently known, phosphors such as zinc sulfide activated with copper and adapted for A.-C. excitation are more readily available and may frequently be desired for a particular application. Hence, the device of the present invention may be designed for either A.-C. or D.-C. input excitation. Furthermore, since the photocondctor in the output circuit does not act as a rectifier, the output power supply may also be either A.-C. or D.-C. While the circuits discussed above have assumed nothing but D.-C. bias and power supplies, it will of course be understood that this is only one case which has been treated first for the sake of clarity in illustrating the circuit principles involved, and that other combinations of bias and power supply may be used as indicated by way of example below.

Figure 18:
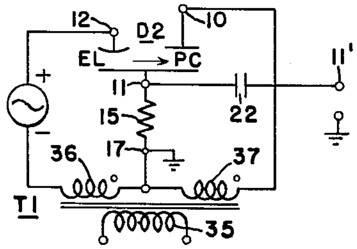

Figures 18 through 22 illustrate various alternative methods of power supply. In Figure 18 device D2 has terminal 17 connected to the mid-point of the secondary of transformer T1. This secondary has coils 36 and 37 which are phased as indicated by the dots and which are fed from the primary 35 of transformer T1, to which input power is supplied. It will of course be understood that coils 36 and 37 may be appropriately designed to apply the desired bias and output power supplies to terminals 12 and 10 respectively, of the device D2. Signal is applied in series with the bias supply as shown and output is taken from terminal 11'. The circuit shown exhibits positive feedback, but it will be understood that this may be reversed by application of the principles earlier developed for the D.-C. case.

Figure 19:
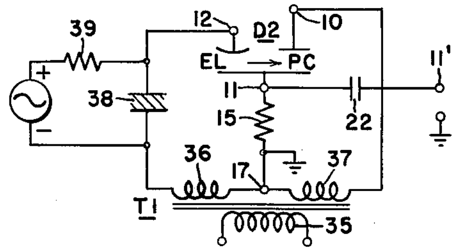

Somewhat better operation is possible if instead of applying the signal directly in series with the input source, it is caused to modulate the input voltage as indicated in Figure 19 for example. In Figure 19 a non-linear capacitor 38 which may, for example, have a barium titanate dielectric, is connected in series with the input side source 36 and signal is applied to this capacitor through a resistor 39. Modulated input power is thus applied to terminal 12.

Figure 20:
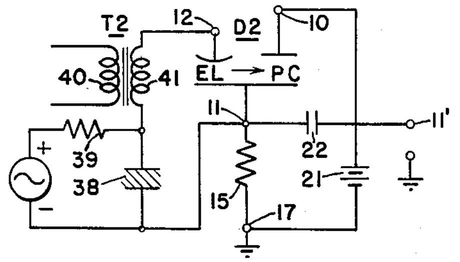

In Figure 20 there is illustrated an A.-C. input supply and a D.-C. output supply. In this circuit a single transformer T2 having a primary 40 and secondary 41 is used as the source of biasing power. Secondary 41 is connected in series with terminal 12 of device D2 and with the nonlinear capacitor 38 to which signal is applied through resistor 39 as in the previous figure. The output power supply may be a battery 21 connected between terminals 17 and 10, and output signal may be taken across resistor 15, through coupling capacitor 22 to terminal 11'.

Figure 21:
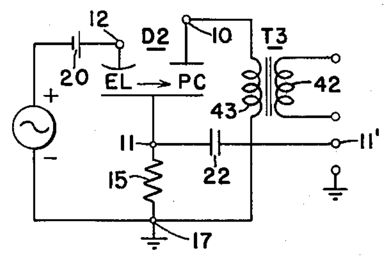

In Figure 21 the reverse situation is illustrated. That is to say, D.-C. bias power may be derived from battery 20 connected directly in series with the signal source between terminals 12 and 17. Output circuit energizing power is supplied through transformer T3 having a primary 42 and secondary 43. Secondary 43 is connected between terminals 10 and 17, and any convenient power source may be applied to primary 42. Output is again taken at terminal 11' through coupling capacitor 22 from across resistor or impedance 15.

Figure 22:
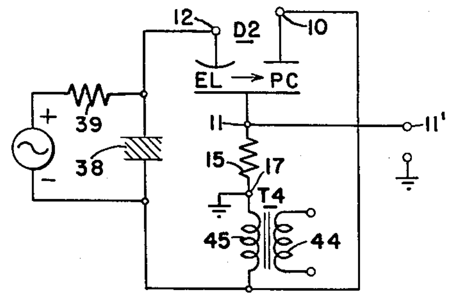

Finally, in Figure 22 there is illustrated a circuit using a single A.-C. source for both the bias and output power supply. In this circuit transformer T4 having a primary 44 and a secondary 45 has its secondary connected in series with the resistor 15 in the feedback branch. The signal is applied through resistor 39 and a nonlinear capacitor 38, which is connected in series between terminal 12 and the transformer secondary 45 in such a fashion as to modulate the input power supply. The grounded end of the transformer secondary is connected to terminal 11 of device D2 through resistor 15. Output is taken from across resistor 15 through coupling capacitor 22 to terminal 11'.

It is thus apparent from a consideration of Figures 19 through 22 that with a suitable choice of the electroluminescent phosphor used, the device of the present invention may be operated from either a single D.-C. or a single A.-C. power supply for both the input bias and output power sources with any type of feedback impedance. Furthermore, if separate sources for the input and output side are used, they may be chosen to be any combination of D.-C. or A.-C. supplies. This flexibility in the choice of the nature of the power supply and the manner of connecting it to the device is a very real advantage in many practical circuit applications.

The device of the present invention has been considered thus far in its operation purely as an amplifier or the like of an electrical input signal with all ambient or other light excluded. However, once the device incorporating a feedback impedance 15 is connected to suitable power and bias supplies, as shown in any of the foregoing circuits, it is apparent that even in the absence of an electrical input signal a light pulse or signal applied to the outside surface of the photoconductive material will lower the photoconductor impedance and thus affect the voltage across the impedance 15 and hence the light output of the electroluminescent cell. Thus, the device may also be considered to be a light amplifier with a choice of positive or negative feedback and having both electrical and light output signals. The light output of the electroluminescent phosphor will increase with increasing voltage across it from impedance 15 and further lower the photoconductor impedance, so that the device may be made to develop more light than is applied to it as a result of the regenerative coupling between its input and output circuits. The signal amplifying action whether of light or electrical signals, is achieved by converting energy from the power supply into signal energy.

It should, however, be noted that although the device of the present invention will amplify or increase the intensity of a light pulse or signal, it is not an image intensifier in the sense that it can not reproduce halftones or grays. This follows from the fact that the common electrode 4, for example, is an equipotential surface by virtue of being an electrode. Hence there can not be a point to point variation of potential over its surface such as would be necessary to reproduce an image.

Another way of looking at the matter is to note that the network of Figure 27, when operated electro-optically and with power and bias supplies connected as shown, for example, in Figure 3, is capable of electrical power gain in the forward direction, i.e. from the electroluminescent cell to the output circuit, and is capable of radiant energy power gain in the reverse direction, i.e. from the irradiated photoconductor to the electroluminescent cell. Furthermore, as indicated in Figures 29, 30, 31 and 33, the device or network may have any combination of electrical and/or radiant energy input and electrical and/or radiant energy output. The interaction between electrical power gain and radiation power gain permits many other modes of utilization.

Figure 24:
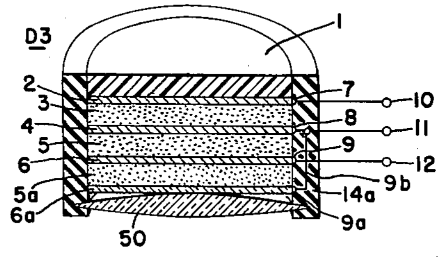
Figure 25:
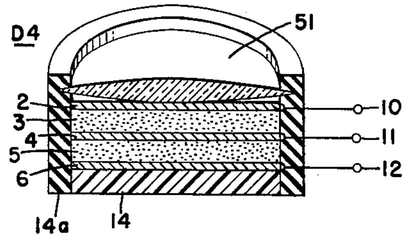
Figure 26:
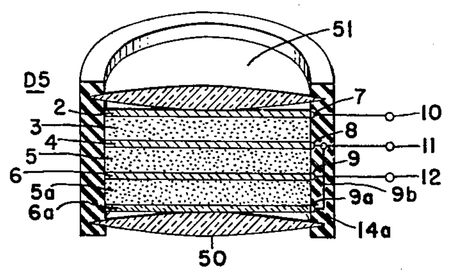

Figure 23 which has previously been described above is an embodiment of the device designed for purely electrical-input electrical-output operation. In Figures 24, 25, and 26, however, there are illustrated embodiments of the device which are specifically designed for the electro-optical types of operation noted above.

The devices D3, D4, and D5 of Figures 24, 25, 26 respectively are quite similar to the device D1 previously described and shown in Figure 23. In Figures 24, 25, and 26 parts corresponding to those in Figure 23 are again indicated by like reference characters.

In Figure 24 supporting member 1 consists of an electrically-insulating light opaque material the inner surface of which may be polished to a light reflecting state. Light-transmitting electrode 2, photoconductive layer 3, light-transmitting electrode 4, and electroluminescent layer 5 may be deposited upon supporting member 1 in the manner described above. Electrode 6, however, in this instance consists of a layer which is light-opaque and both sides of which are light-reflecting. Electrode 6 may be sprayed or otherwise deposited upon electroluminescent layer 5 and may consist of any suitable metallic material such as aluminum of sufficient thickness to be opaque. Deposited upon electrode 6 is another electroluminescent layer 5*a*, upon which in turn is deposited another light-transmitting electrode 6*a* which may be of the same material as light-transmitting electrodes 2 and 4. Contact is made to electrode 6*a* at point 9*a* which is connected by conductor 9*b* to point 8 of electrode 4. It is thus apparent that the two electroluminescent cells formed around layers 5 and 5*a* are connected in parallel between terminals 11 and 12. Therefore when an electrical signal is applied to the device in the manner described above, electroluminescent layer 5*a* will afford a visual light output signal indicating the state of the device. Furthermore, due to the fact that electrode 6 is light opaque, the light output from 5*a* will not result in a decrease of light to the photoconductor such as would occur in the device of Figure 1*a*, and hence will not affect the electrical operation of the device which will depend for its amplifying action upon the light output from electroluminescent layer 5. In order to obtain a suitably directed light output signal, an appropriate lens 50 may be placed contiguous with transparent electrode *6a*, and may be supported by embedding its edges in the encasing sheath 14a.

It will of course be understood that member 50 may be any light-transmitting material whether in the form of a lens or not. If member 50 is shaped as a lens, it may have any desired optical properties and its position as shown with respect to electrode *6a* may, of course, be varied from the direct contact position shown in order to obtain any desired optical relation between the effective light source and its focal length.

It may be noted at this point that the device D1 of Figure 23, when connected in circuits of the type discussed above, will afford an electrical output signal in response to an electrical input signal whereas the device D3 of Figure 24 will afford both an electrical and a light output signal in response to an electrical input signal. This choice of single or dual output may be combined with a choice of single or dual electrical or light input by the devices shown in Figures 25 and 26.

In Figure 25 there is shown a device D4 having an electrically insulating light-opaque supporting member 14, upon which are deposited light-transmitting electrodes 6, electroluminescent layer 5, light-transmitting electrode 4, photoconductive layer 3, and light-transmitting electrode 2. Electrodes 2, 4, and 6 are brought out to terminals 10, 11, and 12 respectively. The device is then encased in a light- opaque material 14a which may also be used to support a lens 51 contiguous with light-transmitting electrode 2. It will of course be understood that the showing of lens 51 in the drawing is illustrative only and that its shape, composition, and position may be such as to produce any desired optical properties. In the operation of the device D4, it is apparent from the discussion above that an electrical output may be obtained from either or both an electrical input signal to terminals 11 and 12 or a light signal input to lens 51. Furthermore, the electrical power gain may be controlled by radiation bias applied to lens 51.

In Figure 26 a device D5 is shown which, in its operation, may be used to obtain both an electrical and a light output signal from either or both an electrical or a light input signal. In device D5 electrode 6 consists of a rigid opaque metallic member which serves as both an electrode and a supporting member and which preferably has both of its surfaces polished for maximum light reflection. Deposited upon this electrode are electroluminescent layers 5, light-transmitting electrode 4, photoconductive layer 3, and light-transmitting electrode 2. Electrodes 2, 4, and 6 are brought out to terminals 10, 11, and 12 as in previous embodiments. Deposited on the other side of electrode 6 is an electroluminescent layer *5a* and a light-transmitting electrode *6a*, which is connected by conductor *9b* from point *9a* to point 8 of electrode 4. Thus the electroluminescent layers 5 and *5a* are connected in parallel in the same fashion as in the device D3 of Figure 24. Encasing sheath 14a which consists of a light-opaque electrically-insulating material is used to support a lens 50 contiguous with electrode *6a* and a lens 51 contiguous with electrode 2. The shape and position of lens 51 may, of course, also be varied to obtain any desired optical properties. If the devices D4 or D5 are exposed to or used in the presence of ambient light their operation will of course be affected by the intensity of this light falling on lens 51. However, if the devices are used in the interior of a light-tight enclosure, such as by mounting them on a panel in the interior of a portion of the assembly of a computer, then the lens 51 may be used to accept a light input "signal" to the device in the true sense of the word. Amplified radiant energy output is then available from the lens 50.

Figure 29:
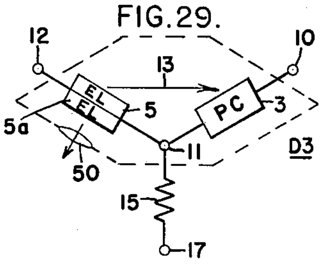
Figure 30:
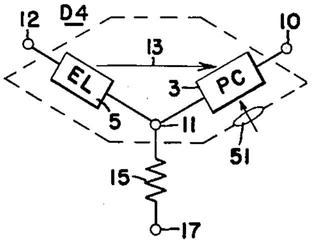
Figure 31:
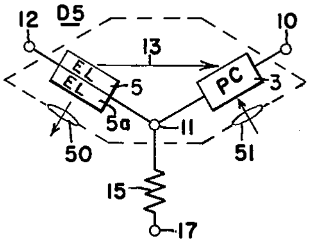

Figures 27 and 28 have previously been described as being the network representation of the electrical configuration of the devices of Figure 1*a*, and Figures 2 and 23 respectively. Similarly Figures 29, 30, and 31 are the network configurations of the devices of Figures 24, 25, and 26, respectively. It should be noted that the network configurations of Figures 27, 28, 29, 30, and 31 are merely another way of considering the devices already described in detail above. The impedance element 15 in Figures 28 through 31 may either be externally connected to the devices shown in Figures 23 through 26 or may be printed on the encasing material in a well known manner. Consequently, corresponding reference characters have been used in these network representations for the parts described in conjunction with earlier figures. These network configurations afford a basis for a convenient manner of regarding the device so that techniques of circuit analysis may be applied to the various manners of operating the device. A basis for such circuit analysis is indicated in the single line block diagrams of Figures 32, 33, and 34.

In Figure 32 as earlier noted, the block Y representing the Y network shown in Figures 27 through 31 is shown as having an electrical signal input comprising voltage $E_1$ and current $I_1$, and an electrical signal output comprising voltage $E_2$ and current $I_2$. As noted above, this type of operation assumes the exclusion of all ambient or other light from the device. The electrical characteristics or impedance parameters of any particular device operated under these conditions may be measured and plotted in a manner to be described below. From the measured electrical characteristics of the device parameters may be obtained for equations determining values of $E_1$, $I_1$, $E_2$, $I_2$ under any particular set of operating conditions. These techniques are more fully set forth in the above-mentioned book edited by Shea.

Figure 33:
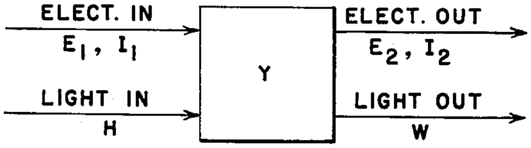

In Figure 33, the block Y representing the Y network of the invention is shown as having both an electrical signal input and output $E_1$, $I_1$, and $E_2$, $I_2$ respectively, and a light signal energy input H and light signal energy output W respectively. The mathematical analysis of this type of operation would require eight-pole analysis rather than the four-pole analysis suggested for the purely electrical case. The light input signal would of course be applied to lens or other light-transmitting medium 51 or transparent supporting member 1 and light output would be taken through the lens or other light-transmitting medium 50 or through light-transmitting electrode 6 itself. In Figure 33, of course, either of the inputs or outputs may, under certain operating conditions, be taken as equal to zero, corresponding, for example, to the operation of the devices of Figures 24 and 25. Furthermore, it will be noted that, particularly when none of the inputs or outputs are zero, there will be coupling between the electrical and the optical terms in the equations describing the network behavior. That is to say, the electrical operation of the device may be biased or modulated by a light input signal and conversely. For example, the electrical power gain of the device is substantially increased merely by excluding all ambient light. Thus a light signal may be used to bias or modulate the operation of the device. It is consequently necessary to measure the parameters of the device under the specified operating conditions in which one may be interested for any one particular application.

Figure 34:
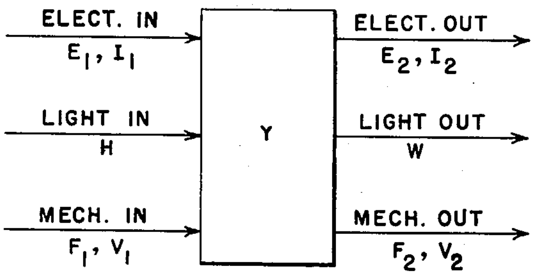

In Figure 34 is shown a similar block diagram wherein the Y network in addition to electrical and optical inputs and outputs may have a mechanical input or output represented by the force and velocity terms $F_1$, $V_1$, and $F_2$, $V_2$ respectively. This type of operation is possible where the feedback impedance 15 comprises one or more piezoelectric crystals or other electromechanical transducers or, more generally, any electrical impedance responsive to any physical condition external to the network. In this instance twelve pole rather than four or eight-pole analysis is required. Again it should be noted that there will be coupling between the various input and output terms in the matrix of simultaneous equations which can be set up to represent the operation of the system. Preferably, however, the characteristics of the device should be measured empirically for any given device under the conditions of a particular application.

Figure 35:
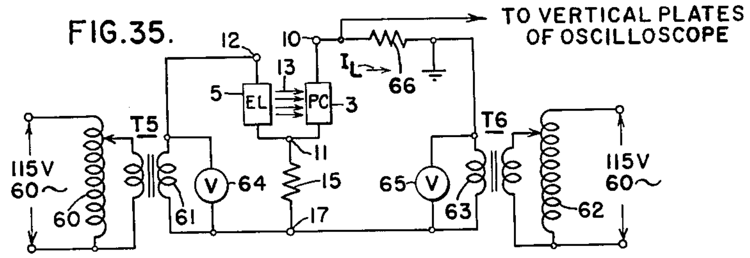
Figure 35 is a circuit diagram of a circuit used to obtain data relating to the operating characteristic of the device and network of the present invention.
Figure 36:
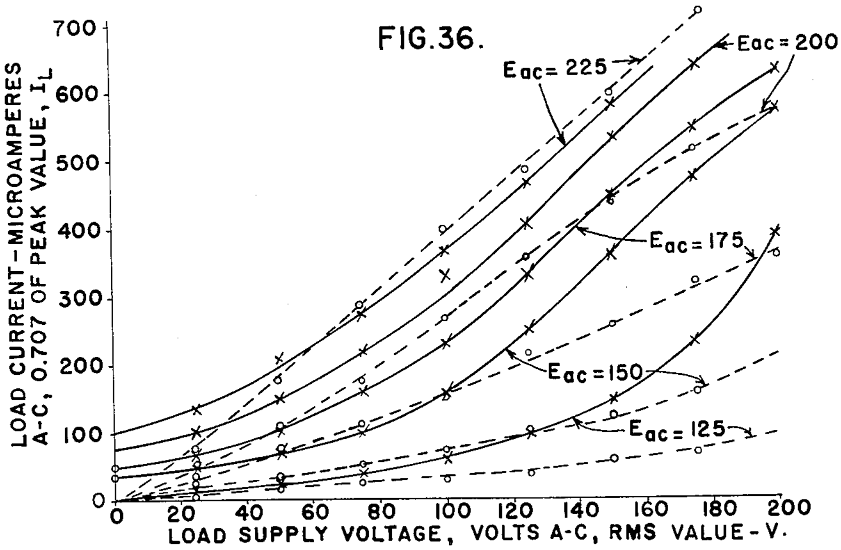
Figures 36 and 37 are graphs of data measured with the circuit of Figure 35.
Figure 37:
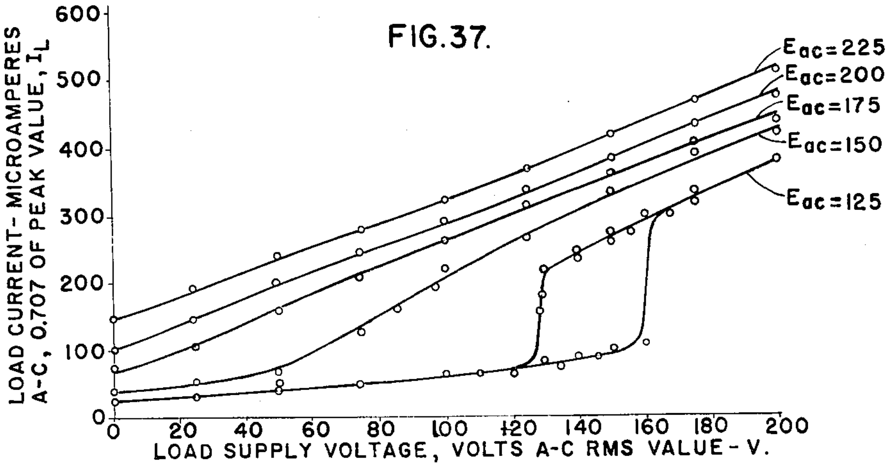

The technique of such measurements for one particular device used in the wholly encased manner to provide simply an electrical input and an electrical output with all external light excluded is illustrated in Figures 35, 36, and 37 merely by way of example.

In Figure 35 there is shown a schematic diagram of a circuit used to measure the data plotted in Figures 36 and 37. The electroluminescent phosphor 5 was zinc sulfide activated by 0.3% by weight of copper. The photoconductor 3 was cadmium sulfide. These elements were arranged in radiation-coupled relationship as indicated by arrow 13 and were connected between terminals 12, 11, and 10 respectively as indicated. A feedback resistor 15 was connected between terminals 11 and 17. The value of this resistor 15 was varied to show its effect on the system by obtaining different sets of curves in a manner to be explained below. Input bias power to the electroluminescent cell was supplied from the 115-volt 60-cycle lines through a transformer T5 having its primary connected across a variably tapped coil 60 and having a secondary 61 which was connected in series between terminals 17 and 12. A volt-meter 64 was connected across secondary 61 to measure the input voltage as one of the parameters of the curves to be plotted. Output power was supplied through a transformer T6 which was also connected to the 115-volt 60-cycle lines by way of the variably-tapped winding 62. Secondary 63 of transformer T6 was connected in series between terminals 17 and a 1000-ohm resistor 66, the other end of which was connected to the terminal 10. A volt-meter 65 was connected across secondary 63 to measure the load supply voltage as another parameter of the curves to be plotted. One end of the resistor 66 was grounded and a connection was made from the other end of this resistor to the vertical plates of an oscilloscope as indicated in the drawings. By this means the voltage across the known resistor 66 could be read as a measure of the load current $I_L$ in the output circuit. The load supply voltage and the load current at various constant values of input voltage were measured as parameters of the static output characteristics of the device for different values of feedback resistance, as shown in Figures 36 and 37.

Figure 36 is a graph of the load supply voltage V in A.-C. volts R.M.S. (as measured by volt-meter 65) plotted against the load current $I_L$ in microamperes A.-C. (as measured from the reading of the voltage across resistor 66 taken by the oscilloscope) for various constant values of input voltage $E_{ac}$ (as measured by volt-meter 64). The dashed set of curves plotted through the circles represent the output characteristic of the device at different specified values of input voltage with the feedback resistance 15 equal to zero. That is to say, this set of characteristic curves represents the characteristic of the device with no feedback used. The solid lines plotted through the observed data shown by crosses is the same type of plot with the feedback resistance 15 equal to 290,000 ohms. It will be noted that this value of feedback resistance substantially modifies the output characteristics of the device, but that these curves are still single valued indicating that stable operation would result from this particular value of feedback resistance.

In Figure 37 there is shown a plot of data similar to that shown in Figure 36, but for a value of feedback resistance 15 equal to 400,000 ohms. In Figure 37 it will be noted that for a value of input voltage $E_{ac}$ equal to 125 volts there is a region of the characteristic curve, located approximately between values of output voltage equal to 130 and 160 volts, in which the load current through resistor 66 may have two distinct values for any one value of load supply voltage. Such a region, which is commonly known as a hysteresis loop, provides a basis for bistable operation of the device. That is to say, within this region a load line representing the value of load resistance used with the device may intersect the curve at two points so that the output or load current may have either one of two values representing two stable states of operation for the same value of input voltage $E_{ac}$. Triggering from one state to the other can be achieved through the application of a voltage pulse of suitable polarity either at the input terminals or across one of the elements of the input circuit or of the output circuit. Of course in devices provided with means for receiving a light input signal, triggering can also be achieved by such a signal.

Such bistable circuits form the basis of operation of many computers as is well known in the art. The two stable states may, for example, be used to represent the binary digits 0 and 1. The particular bistable circuit and device of the present invention is characterized by the advantages of economy of manufacture and the flexibility of choice of circuit parameters and power supplies as well as the variety of choices of electrical and/or optical input and output signal paths which may be used for triggering or read in as well as for read out functions. It is of course obvious that a plurality of the devices may be cascaded with coupling between the devices either by electrical or optical connection or both as may be desirable in any particular application. Thus by the present invention, information in the form of a light signal is readily converted to information in the form of an electrical signal and vice versa. Furthermore the degree of interaction between the two forms of energy is readily controlled by choice of circuit parameters.

It should be further noted that whether or not given operating voltages provide either stable or bistable operation of the device of the present invention is determined by the amount of feedback resistance used. Thus, it is apparent that with a feedback resistance of zero or 290,000 ohms, the curves shown in Figure 36 result and the device may be operated as a stable amplifier of electrical or light signals with $E_{ac}$=125 v. However, by increasing the fedback resistance to 400,000 ohms, enough regeneration is provided so that the amplifier becomes bistable. Such susceptibility to accurate circuit design for stable or bistable operation according to the needs of any particular application is another of the major advantages of the device of the present invention.

A number of interesting qualitative conclusions may be drawn from the curves of Figures 36 and 37. First, with no feedback resistance used, the dashed curves of Figure 36 are very nearly linear. With feedback impedance 15 incorporated in a device such as that shown in Figure 2, however, it is apparent that the form of the characteristics is not even approximately linear and that all of the curves no longer intersect the $I_L$ axis at zero. Furthermore, the slope and linearity of the output characteristic curves are obviously modified by changes in the value of the feedback impedance which ultimately results in the formation of a hysteresis loop as shown in Figure 37 in the curve for $E_{ac}$=125 v.

While the principles of the invention have now been made clear in illustrative embodiments, there will be immediately obvious to those skilled in the art many modifications in structure, arrangement, proportions, the elements and components used in the practice of the invention, and otherwise, which are particularly adapted for specific environments and operating requirements without departing from those principles. The appended claims are therefore intended to cover and embrace any such modifications, within the limits only of the true spirit and scope of the invention.

What I claim as new and desire to secure by Letters Patent of the United States is:

1. An article of manufacture comprising a disc-shaped light-opaque rigid metallic electrode, a first layer comprising an electroluminescent phosphor in extended area contact with one side of said electrode, a second light-transmitting electrode in extended area contact with said first layer, a second layer comprising a photoconductive material in extended area contact with said second electrode, a third light-transmitting electrode in extended area contact with said photoconductive layer, a third layer comprising an electroluminescent phosphor in extended area contact with the other side of said first electrode, a fourth light-transmitting electrode in extended area contact with said third layer, a sheath of electrically-insulating light-opaque material surrounding said disc shaped member, and the layers and electrodes thereon, a first lens adjacent said third electrode and supported by said sheath, a second lens adjacent said fourth electrode and supported by said sheath, a common electrical connection means to said second and fourth electrodes and separate electrical connection means to said first and third electrodes.

2. An article of manufacture comprising a disc-shaped light-opaque electrically-insulating support member, a first electrode in extended area contact with said support member, a first layer comprising an electroluminescent phosphor in extended area contact with said first electrode, a second light transmitting electrode in extended area contact with said first layer, a second layer comprising a photoconductor in extended area contact with said second electrode, a third light-transmitting electrode in extended area contact with said second layer, a sheath of electrically-insulating light-opaque material surrounding said disc member and the layers and electrodes thereon, and a lens adjacent said third electrode and supported by said sheath.

3. An article of manufacture comprising a disc-shaped electrically-insulating light-opaque support member, a first electrode in extended area contact with said member, a first layer comprising a photoconductor in extended area contact with said first electrode, a second light-transmitting electrode in extended area contact with said photoconductor, a second layer comprising an electroluminescent phosphor in extended area contact with said second electrode, a third light-reflecting electrode in extended area contact with said second layer, a third layer comprising an electroluminescent phosphor in extended area contact with said third electrode, a fourth light-transmitting elecrode in extended area contact with said third layer, a sheath of electrically-insulated light-opaque material surrounding said disc shaped member, and the layers and electrodes thereon, and a lens supported by said sheath and positioned adjacent said fourth electrode, a common electrical connection means to said second and fourth electrodes, and separate electrical connection means to said first and third electrodes.

4. An article of manufacture comprising a first light-reflecting electrode, a photoconductor deposited on and in extended area contact with said electrode, a second light-transmitting electrode deposited on and in extended area contact with said photoconductor, a substance comprising an electroluminescent phosphor deposited on and in extended contact with said second electrode, a third light-reflecting electrode deposited on and in extended contact with said substance, said photoconductor having an impedance which varies as a function of the radiation emitted by said electroluminescent phosphor and being positioned in radiation-coupled relationship with said photoconductor, said article being encased in an electrically-insulating light-opaque material, and electrical connection means to said first, said second, and said third electrode.

5. An article of manufacture comprising a light-opaque electrically-insulating support member, a first layer comprising an electrically conductive material deposited upon and in extended area contact with said support member, a second layer comprising a photoconductive material deposited on and in extended area contact with said first layer, a third layer comprising a light-transmitting electrically-conductive material deposited on and in extended area contact with said photoconductive layer, a fourth layer comprising an electroluminescent phosphor deposited on and in contact with said third layer, a fifth layer comprising an electrically-conductive material deposited on and in contact with said fourth layer, an electrical impedance element having a first end connected to said third layer for providing feedback, said article being encased in an electrically-insulating light-opaque material, and electrical connection means to said first and said fifth layers and to both ends of said electrical impedance element.

6. An article of manufacture comprising a light-transmitting support member, a first layer comprising an electrically-conductive light-transmitting material deposited on and in extended area contact with said support member, a second layer comprising a photoconductive material deposited upon and in extended area contact with said first layer, a third layer comprising an electrically-conductive light-transmitting material deposited on and in extended area contact with said second layer, a fourth layer comprising an electroluminescent phosphor deposited on and in contact with said third layer, a fifth layer comprising an electrically-conductive light-transmitting material deposited on and in contact with said fourth layer, and an independent electrical connection means to each of said first, third, and fifth layers for permitting feedback.

7. An article of manufacture comprising a first electrode, a second electrode, and a third electrode, a first substance comprising an electroluminescent phosphor positioned between said first and second electrodes and being in contact with said first and second electrodes, said second electrode consisting of a radiation-transmitting electrically-conducting material, a photoconductor positioned between said second and third electrodes and having one major surface area in contact only with said second electrode and another major surface area in contact only with said third electrode, said photoconductor being in radiation-coupled relationship with said electroluminescent phosphor and having an electrical impedance which varies as a function of the radiation emitted from said electroluminescent phosphor and an independent electrical connection means to each of said first, second and third electrodes for permitting feedback.

8. An article of manufacture comprising a first electrode, a second electrode, and a third electrode, a first substance comprising an electroluminescent phosphor positioned between said first and second electrodes and being in contact with said first and second electrodes, said second electrode consisting of a radiation-transmitting electrically-conducting material, a photoconductor positioned between and in extended area contact with said second and third electrodes, said photoconductor being in radiation-coupled relationship with said electroluminescent phosphor and having an electrical impedance which varies as a function of the radiation emitted from said electroluminescent phosphor; an electrical impedance element having one end connected to said second electrode for providing feedback, said article being encased in an electrically-insulating material, and independent electrical connection means to each of said first and third electrodes and to other end of said electrical impedance element respectively.

9. A signal responsive network having three branches, one end of each branch being connected to a common point, the other end of each of said branches being a separate available terminal, each of said terminals being separate from each other and from said common point, each of said branches containing at least one electrical circuit element, said circuit element in said first branch comprising an electroluminescent phosphor, said circuit element in said second branch comprising a photoconductor, said electroluminescent phosphor and said photoconductor further being positioned in radiation-coupled relationship, said photo-conductor having an impedance which varies as a function of the radiation emitted by said electroluminescent phosphor in response to an electrical signal and said circuit element in said third branch exhibiting an impedance for providing feedback.

10. A signal responsive network having three branches, one end of each branch being connected to a common point, the other end of each of said branches being a separate available terminal, each of said terminals being separate from each other and from said common point, each of said branches containing at least one electrical circuit element, said circuit element in said first branch comprising an electroluminescent phosphor, said circuit element in said second branch comprising a photoconductor, said electroluminescent phosphor and said photoconductor further being positioned in radiation-coupled relationship, said photoconductor having an impedance which varies as a function of the radiation emitted by said electroluminescent phosphor in response to an electrical signal, said circuit element in said third branch comprising at least a source of electrical energy and exhibiting an impedance for providing feedback.

11. A signal responsive network having three branches, one end of each branch being connected to a common point, the other end of each of said branches being a separate available terminal, each of said branches containing at least one electrical circuit element, said circuit element in said first branch comprising an electroluminescent phosphor, said circuit element in said second branch comprising a photoconductor, said electroluminescent phosphor and said photoconductor further being positioned in radiation-coupled relationship, said photoconductor having an impedance which varies as a function of the radiation emitted by said electroluminescent phosphor in response to an electrical signal, said circuit element in said third branch having an impedance the value of which is responsive to a physical condition external to said network.

12. A signal responsive network having three branches, one end of each branch being connected to a common point, the other end of each of said three branches being a separate available terminal, each of said branches containing at least one electrical circuit element, said circuit element in said first branch comprising an electroluminescent phosphor, said circuit element in said second branch comprising a photoconductor, said electroluminescent phosphor and said photoconductor further being positioned in radiation-coupled relationship, said photoconductor having an impedance which varies as a function of the radiation emitted by said electroluminescent phosphor in response to an electrical signal, said circuit element in said third branch comprising an electrical impedance element for providing feedback, said impedance element being of the same order of magnitude as the impedance of said photoconductor, and means to exclude ambient light from said electroluminescent phosphor and said photoconductor.

13. A signal responsive network having three branches, one end of each branch being connected to a common point, the other end of each of said three branches being a separate available terminal, each of said terminals being separate from each other and from said common point, each of said branches containing at least one electrical circuit element, said circuit element in said first branch comprising an electroluminescent phosphor, said circuit element in said second branch comprising a photoconductor, said electroluminescent phosphor and said photoconductor further being positioned in radiation-coupled relationship, said photoconductor having an impedance which varies as a function of the radiation emitted by said electroluminescent phosphor in response to an electrical signal, said circuit element in said third branch comprising an electrical impedance element, means to exclude ambient radiation from said electroluminescent phosphor and said photoconductor, and means to apply a radiation input signal to said photoconductor.

14. A signal responsive network having three branches, one end of each branch being connected to a common point, the other end of each of said three branches being a separate available terminal, each of said terminals being separate from each other and from said common point, each of said branches containing at least one electrical circuit element, said circuit element in said first branch comprising an electroluminescent phosphor, said circuit element in said second branch comprising a photoconductor, said electroluminescent phosphor and said photoconductor further being positioned in radiation-coupled relationship, said photoconductor having an impedance which varies as a function of the radiation emitted by said electroluminescent phosphor in response to an electrical signal, said circuit element in said third branch comprising an electrical impedance element, means to exclude ambient radiation from said electroluminescent phosphor and said photoconductor, and means to derive a radiation output signal from said electroluminescent phosphor.

15. A signal responsive network comprising three branches connected to a common terminal, the other end of each of said three branches being a separate first, second, and third terminal, respectively, each of said branches containing an electrical impedance element, said impedance element connected between said common terminal and said first terminal comprising an electroluminescent phosphor, said impedance element connected between said common terminal and said second terminal being a photoconductor, said electroluminescent phosphor and said photoconductor further being positioned in radiation-coupled relationship, said photoconductor having an impedance which varies as a function of the radiation emitted by said electroluminescent phosphor in response to an electrical signal; said first, said third, and said common terminals defining a first loop of said network, a source of electrical signal in said first loop, and a source of electrical energy connected in a second loop defined by said second, said third, and said common terminals.

16. A signal responsive network comprising, a first, a second, and a third electrode, at least said second electrode being radiation-transparent, an electroluminescent phosphor positioned between and in contact with said first and second electrodes, a photoconductor positioned between and in extended area contact with said second and third electrodes, said photoconductor having an impedance which varies as a function of the radiation emitted by said electroluminescent phosphor in response to an electrical signal, said photoconductor further being positioned in radiation-coupled relationship with said electroluminescent phosphor; an electrical impedance element having one end connected to said second electrode and the other end connected to both said first and said third electrode; and a source of electrical energy in at least one of the branches of said network.

17. A signal responsive network comprising, a first, a second, and a third electrode, at least said second electrode being radiation-transparent, an electroluminescent phosphor positioned between and in contact with said first and second electrodes, a photoconductor positioned between and in extended area contact with said second and third electrodes, said photoconductor having an impedance which varies as a function of the radiation emitted by said electroluminescent phosphor in response to an electrical signal, said photoconductor further being positioned in radiation-coupled relationship with said electroluminescent phosphor; an electrical impedance element having a first end connected to said second electrode, a bias power supply and a source of electrical signal connected between the second end of said impedance and said first electrode, an output power supply connected between the second end of said impedance and said third electrode, and means to derive an electrical output across said impedance.

18. A signal responsive network comprising, a first, a second, and a third electrode, at least said second electrode being radiation-transparent, an electroluminescent phosphor, said first and second electrodes being in electrically exciting relationship with said electroluminescent phosphor, a photoconductor positioned between and in extended area contact with said second and third electrode, said photoconductor having a volume impedance which varies as a function of the radiation emitted by said electroluminescent phosphor in response to an electrical signal, said photoconductor further being positioned in radiation-coupled relationship with said electroluminescent phosphor; a first electrical impedance element having a first end connected to said second electrode, a bias power supply and a source of electrical signal connected between the second end of said first impedance and said first electrode; a second electrical impedance element and an output power supply connected between the second end of said first impedance and said third electrode, and means to derive an electrical output from across at least one of said impedances.

19. A signal responsive network having at least four electrically distinct connection points, an electroluminescent phosphor connected between the first and the second of said points, a photoconductor connected between the second and the third of said points, said photoconductor being positioned in radiation-coupled relationship with and having a volume impedance which varies as a function of the radiation emitted from said electroluminescent phosphor in response to an electrical signal, and an electrical impedance element connected between the second and the fourth of said points.

20. A signal responsive network having at least four electrically distinct connection points, an electroluminescent phosphor connected between the first and the second of said points, a photoconductor connected between the second and the third of said points, said photoconductor being positioned in radiation-coupled relationship with and having an impedance which varies as a function of the radiation emitted from said electroluminescent phosphor in response to an electrical signal, a resistor connected between the second and the fourth of said points, a source of electrical energy connected between the fourth and the third of said points, a source of electrical signal connected between said fourth and said first points, and means to take an electrical output between said second and said fourth points.

21. A signal responsive network having at least four electrically distinct connection points, an electroluminescent phosphor connected between the first and the second of said points, a photoconductor connected between the second and the third of said points, said photoconductor being positioned in radiation-coupled relationship with and having an impedance which varies as a function of the radiation emitted from said electroluminescent phosphor in response to an electrical signal, a resistor connected between the second and the fourth of said points, a source of electrical energy and a load impedance connected between the fourth and the third of said points, and a source of electrical signal connected between the fourth and the first of said points.

22. A signal responsive network having at least four electrically distinct connection points, an electroluminescent phosphor connected between the first and the second of said points, a photoconductor connected between the second and the third of said points, said photoconductor being positioned in radiation-coupled relationship with and having an impedance which varies as a function of the radiation emitted from said electroluminescent phosphor in response to an electrical signal, a resistor connected between said second and said fourth point, and a source of unidirectional electrical energy having one pole connected to said fourth point and the other pole connected to said third point and to a source of electrical signal in series with said first point.

23. A signal responsive network having at least four electrically distinct connection points, an electroluminescent phosphor connected between the first and the second of said points, a photoconductor connected between the second and the third of said points, said photoconductor being positioned in radiation-coupled relationship with and having an impedance which varies as a function of the radiation emitted from said electroluminescent phosphor in response to an electrical signal, a resonant circuit connected between said second and said fourth point, a source of electrical energy connected between said fourth and said third point, and a source of electrical signal connected between said fourth and said first point.

24. A signal responsive network having at least four electrically distinct connection points, an electroluminescent phosphor connected between the first and the second of said points, a photoconductor connected between the second and the third of said points, said photoconductor being positioned in radiation-coupled relationship with and having an impedance which varies as a function of the radiation emitted from said electroluminescent phosphor in response to an electrical signal, a resonant circuit connected between said second and said fourth point, and a source of unidirectional electrical energy having one pole connected to said fourth point and the other pole connected to said first and said third point.

25. A signal responsive network having at least four electrically distinct connection points, an electroluminescent phosphor connected between the first and the second of said points, a photoconductor connected between the second and the third of said points, said photoconductor being positioned in radiation-coupled relationship with and having an impedance which varies as a function of the radiation emitted from said electroluminescent phosphor in response to an electrical signal, a piezoelectric crystal connected between said second and said fourth point, and a source of unidirectional electrical energy having one pole connected to said fourth point and the other pole connected to said first and to said third point.

26. A signal responsive network having at least four electrically distinct connection points, an electroluminescent phosphor connected between the first and the second of said points, a photoconductor connected between the second and the third of said points, said photoconductor being positioned in radiation-coupled relationship with and having an impedance which varies as a function of the radiation emitted from said electroluminescent phosphor in response to an electrical signal, a magnetostrictive rod connected between said second and said four points, and a source of unidirectional electrical energy having one pole connected to said fourth point and the other pole connected to said first and said third point.

27. A signal responsive network having at least four electrically distinct connection points, an electroluminescent phosphor connected between the first and the second of said points, a photoconductor connected between the second and the third of said points, said photoconductor being positioned in radiation-coupled relationship with and having an impedance which varies as a function of the radiation emitted from said electroluminescent phosphor in response to an electrical signal, a transformer, one end of the primary winding of said transformer connected to said second point and the other end connected to said first point, one end of the secondary winding of said transformer connected to said second point and the other end connected to said fourth point, means connected between said second and said fourth points to tune the secondary of said transformer, and a source of unidirectional electrical energy connected between said fourth and said third points.

28. A signal responsive network having at least four electrically distinct connection points, an electroluminescent phosphor connected between the first and the second of said points, a photoconductor connected between the second and the third of said points, said photoconductor being positioned in radiation-coupled relationship with and having an impedance which varies as a function of the radiation emitted from said electroluminescent phosphor in response to an electrical signal, a resistor connected between said second and said fourth points, a transformer having a tapped winding, said tap being connected to said fourth point, one end of said winding being connected to said first point and the other end of said winding being connected to said third point, and means for electrically exciting said winding.

29. A signal responsive network having at least four electrically distinct connection points, an electroluminescent phosphor connected between the first and the second of said points, a photoconductor connected between the second and the third of said points, said photoconductor being positioned in radiation-coupled relationship with and having an impedance which varies as a function of the radiation emitted from said electroluminescent phosphor in response to an electrical signal, a resistor connected between said second and said fourth points, a transformer having a tapped winding, said tap being connected to said fourth point, one end of said winding being connected to said third point and the other end of said winding being connected to said first point through a nonlinear capacitor, means for electrically exciting said winding and a source of electrical signal applied to said nonlinear capacitor.

30. A signal responsive network having at least four electrically distinct connection points, an electroluminescent phosphor connected between the first and the second of said points, a photoconductor connected between the second and third of said points, said photoconductor being positioned in radiation-coupled relationship with and having an impedance which varies as a function of the radiation emitted from said electroluminescent phosphor in response to an electrical signal, a resistor connected between said second and said fourth points, a source of unidirection electrical energy connected between said fourth and said third points, a source of electrical energy and a nonlinear capacitor connected between said first and said second points, and means to apply an electrical signal to said nonlinear capacitor.

31. A signal responsive network having at least four electrically distinct connection points, an electroluminescent phosphor connected between the first and the second of said points, a photoconductor connected between the second and third of said points, said photoconductor being positioned in radiation-coupled relationship with and having an impedance which varies as a function of the radiation emitted from said electroluminescent phosphor in response to an electrical signal, a resistor connected between said second and said fourth points, a source of unidirectional electrical energy and a source of electrical signal connected between said fourth and said first point, and a source of alternating electrical energy connected between said fourth and said third points.

32. A signal responsive network having at least four electrically distinct connection points, an electroluminescent phosphor connected between the first and the second of said points, a photoconductor connected between the second and third of said points, said photoconductor being positioned in radiation-coupled relationship with and having an impedance which varies as a function of the radiation emitted from said electroluminescent phosphor in response to an electrical signal, a resistor connected between said second and said fourth points, a transformer having primary and secondary windings, the secondary of said transformer having one end connected to said fourth point and the other end connected to said first point through a nonlinear capacitor and to said third point, means to apply power to the primary of said transformer and means to apply signal to said nonlinear capacitor.

References Cited in the file of this patent

UNITED STATES PATENTS

| | | |
|---|---|---|
| 2,735,049 | De Forest | Feb. 14, 1956 |
| 2,839,690 | Kazan | June 17, 1958 |

OTHER REFERENCES

"Electro-Optical Transducers or Switches," Quarterly Report No. 3, Second Series of the Computer Components Fellowship No. 347, April 1, 1954, to June 30, 1954, Mellon Institute of Industrial Research.

"Principles of the Light Amplifier and Allied Devices," by Tomlinson, Journal of the British Institute of Radio Engineers, March 1957.